INVENTORS
YASUO TATSUTOMI
TOMOO TADOKORO

BY Sughrue, Rothwell, Mion, Zinn & Macpeak
ATTORNEYS

United States Patent Office 3,611,715
Patented Oct. 12, 1971

3,611,715
DEVICE FOR CONTROLLING A SECONDARY AIR SUPPLY IN AN EXHAUST GAS PURIFYING DEVICE
Yasuo Tatsutomi, Hiroshima, and Tomoo Tadokoro, Kure, Japan, assignors to Toyo Kogyo Company Limited, Hiroshima, Japan
Filed Apr. 20, 1970, Ser. No. 29,970
Claims priority, application Japan, Apr. 18, 1969, 44/36,222
Int. Cl. F01n 3/10; F04b 49/08
U.S. Cl. 60—30    5 Claims

ABSTRACT OF THE DISCLOSURE

A device for controlling the air supply to an exhaust gas purifying device in which an air pump driven by an internal combustion engine is connected to the exhaust gas purifying device by a first conduit having a check valve means. A second conduit is connected at one end to said first conduit between the check valve means and the air pump and at the other end to the atmosphere and this second conduit has a valve between the second conduit and the atmosphere which acts in response to the engine speed or vehicle speed and thereby controls the secondary air supply to the exhaust gas system in cooperation with the check valve means by providing a by-pass to the check valve. An auxiliary passage is provided in this valve for communicating between the second conduit and the atmosphere, and an auxiliary valve having a larger resilient closing force than that of said check valve closes this auxiliary passage. If the engine speed is such that the valve in the second conduit is closed and the air pressure from the air pump exceeds a predetermined amount, the auxiliary valve is opened against the resilient closing force to hold the pressure in the conduits at the predetermined value.

BACKGROUND OF THE INVENTION

This invention relates to improvement of an exhaust gas purifying device in an internal combustion engine and more particularly to a device for controlling the air supply to an exhaust gas system by controlling the air pressure within the conduit between an air pump driven by the internal combustion engine and the gas purifying device.

Since the amount of an exhaust gas from an internal combustion engine and of unburned detrimental components such as carbon monoxide and hydrocarbon contained therein generally varies depending upon operating conditions of an automobile such as the engine or vehicle speed, the optimum amount of the secondary air required for removing the unburned detrimental components also varies accordingly. More air must be supplied to an exhaust gas system when the engine speed or vehicle speed is low so that more unburned detrimental components are contained in the exhaust gas while the less air must be supplied to the exhaust gas system when the engine speed or vehicle speed is high since a lesser amount of unburned detrimental components are contained in the exhaust gas.

Conventional gas purifying devices have not provided means to vary the amount of air supplied to the gas purifying device. This is disadvantageous because if excess secondary air is supplied to the gas purifying device at low engine speed or low vehicle speed, the temperature of the exhaust gas decreases with the result that the exhaust purifying device such as reburning reactive device or catalytic device in the exhaust gas system is hampered removing the unburned detrimental components. In addition, if excess secondary air is supplied to the exhaust gas system upon high engine speed or high vehicle speed, the temperature of the exhaust gas increases more than required with the result that the durability of the exhaust gas system becomes extremely low.

SUMMARY OF THE INVENTION

It is the object of this invention to eliminate the disadvantages of the conventional exhaust gas purifying device by providing a novel and improved device for controlling a secondary air supply to an exhaust gas purifying device.

According to one aspect of the present invention, there is provided a device for controlling a secondary air supply in an exhaust gas purifying device which has an air pump driven by an internal combustion engine. This pump is connected to an exhaust gas system of an engine by a first conduit having a check valve means. A second conduit is connected at one end to said first conduit between the check valve means and the air pump and at the other end to the atmosphere. A valve in the second conduit operates in response to the engine speed or vehicle speed, and thereby controls the secondary air supply to the exhaust gas system in cooperation with the check valve means by providing a by-pass to the check valve. An auxiliary passage is provided in the valve for communicating between the second conduit and the atmosphere and an auxiliary valve having a larger resilient closing force than that of the check valve means for closing the auxiliary passage whereby if the pressure in the conduit becomes a predetermined value (and the engine speed is such as to close the main valve), the auxiliary valve is opened against the resilient closing force to hold the pressure in the conduit below a predetermined value.

The other features and advantages of the present invention will become apparent from the following description taken in conjunction with the accompanying drawings in which:

DETAILED DESCRIPTION OF THE INVENTION

Figure 1:
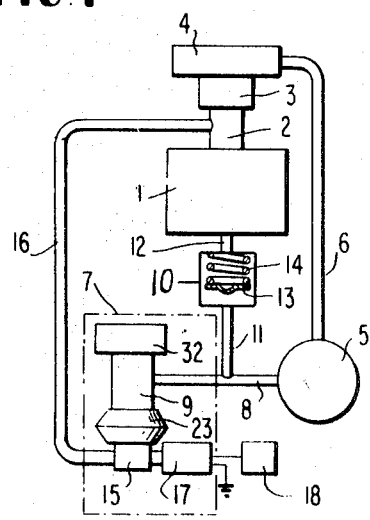
FIG. 1 is a schematic view of an internal combustion engine provided with a device of this invention.
Figure 2:
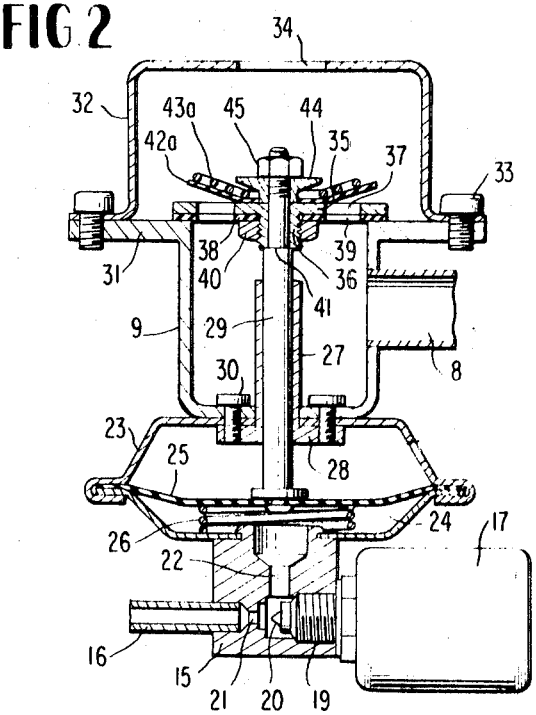
FIG. 2 is a sectional view of a device of this invention.
Figure 3:
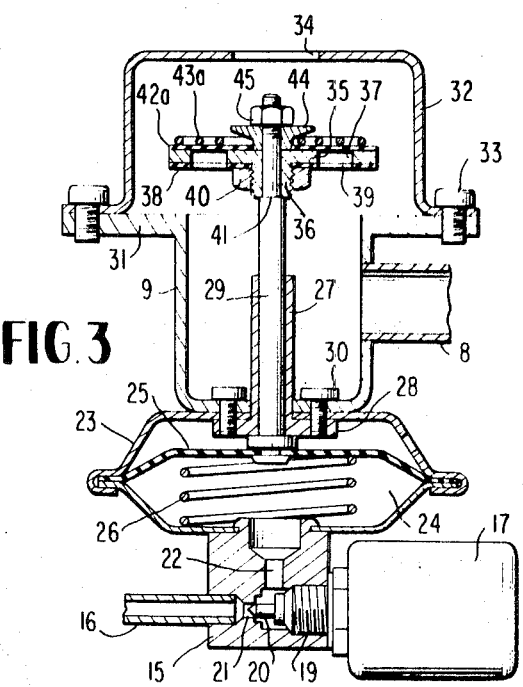
FIG. 3 is a sectional view of a device of this invention in operation.

Reference is now made to the drawings, and particularly to FIGS. 1 through 3 which show a schematic view of the combination of an internal combustion engine with its accessories and sectional view of the device of this invention. 1 is an engine body and 2 an air intake manifold communicating with an air intake port of the engine body 1. A carburetor 3 having an air cleaner 4 is communicated with the air intake manifold 2 and an air pump 5 is driven by the internal combustion engine. A conduit 6 connects air cleaner 4 to the air pump 5, and conduit 8 connects the air pump 5 to a housing 9 of the control device 7. A check valve housing 10 is connected to the conduit 8 by a conduit 11 and is simultaneously connected to the exhaust gas system of the engine by conduit 12. A check valve 13 for controlling the secondary air supply to the exhaust gas system of the internal combustion engine within the check valve housing 10 is depressed by a spring 14 in the direction to close the conduit 11.

The vacuum control 15 of control device 7 is connected by vacuum conduit 16 to the air intake conduit 2. The vacuum controller 15 includes a solenoid valve device 17 engaging a screw 19 which in turn engages valve 20. A detector 18 detecting the engine speed or vehicle speed is electrically connected to the solenoid valve device 17 for energizing the solenoid valve device 17 when the engine or vehicle speed becomes below a predetermined value and for de-energizing it when the engine or vehicle speed becomes over a predetermined value. A valve 20 provided in the solenoid valve device 17 opens or closes a vacuum passage 21 communicating with the vacuum conduit 16. A vacuum passage 22 is provided in the vacuum controller 15 for communicating with the vacuum passage 21.

A diaphragm assembly 23 has a diaphragm 25 dividing the interior of the assembly into two chambers, a vacuum chamber 24 and an atmospheric chamber. The vacuum chamber 24 is communicated by the conduit 22 with the vacuum controller 15. A spring 26 is disposed in the vacuum chamber 24 for urging the diaphragm 25 upwardly as shown in FIGS. 2 and 3. A bearing 27 is mounted by a flange 28 within the diaphragm assembly 23 and passes through the diaphragm assembly 23. A rod 29 is fixed at the lower end to the central portion of the diaphragm 25 and passes through the bearing 27. Bolts 30 fix the frame 9 to the flange 28 of the bearing 27 and also to assembly 23. Flange 31 of the frame 9 is fixed to a casing 32 having a port 34 communicating with the atmosphere by bolts 33.

The valve 35 has a boss 36 provided with a screw at the outer periphery and a plurality of auxiliary passages 37. A gasket 38 has an auxiliary passage 39 aligned with the auxiliary passages 37 of the valve 35 and is tightened by a nut 40 threaded to the threaded portion of the boss 36. A stepped portion 41 of boss 36 prevents the boss 36 from moving the valve 35 downwardly as shown in FIGS. 2 and 3.

The auxiliary valve 42a is made of rubber having a nature of anti-fatigue and 43a a conical coil spring having a resiliency larger than that of the spring 14 of the check valve 10. Holder 44 holds the conical coil spring 43a so as to urge the auxiliary valve 42a onto the upper surface of the valve 35 while nut 45 is threaded to the upper end of the rod 29 so as to prevent the valve 35 and holder 44 from moving upwardly as shown in FIGS. 2 and 3.

Figure 4:
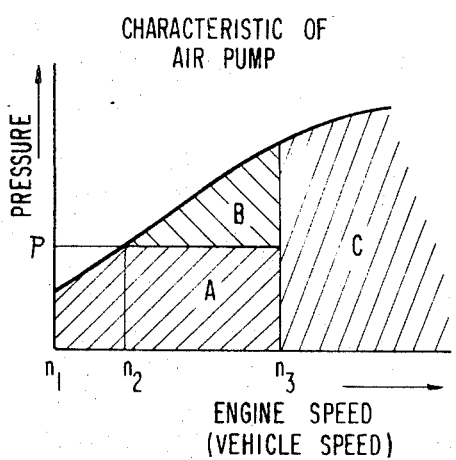
FIG. 4 is a graphic representation showing the relationship between the pressure of an air pump and the engine speed.

In operation when the engine rotates at a speed lower than a predetermined speed such as 2,800 r.p.m. and accordingly the vehicle runs in a certain speed lower than a predetermined speed as shown by $n1-n3$ in FIG. 4, the solenoid valve device 17 is energized by the detector 18 and causes valve 20 to open the vacuum passage 21 and accordingly the vacuum within the vacuum conduit 16 urges the vacuum chamber 24 of the diaphragm assembly 23 so as to depress the diaphragm downward against the tension of the spring 26. As a result, the rod 29 slides through the bearing 27 until the lower surface of the gasket 38 contacts the upper surface of the housing 9 in the drawing so as to prevent the air within the housing 9 from discharging to the atmosphere. In such a state, when the engine or vehicle speed becomes lower than the value $n2$ shown in FIG. 4, the air pressure in the passage 8, housing 9 and conduit 11 will all substantially equal the output pressure of pump 5. This pressure is not sufficient to open the auxiliary valve 42a against the conical coil spring 43a so that the secondary air acts to open the check valve 13 of the check valve device 10 against the tension of the spring 14 which is less than the tension of coil spring 43a and air is supplied through the conduit 12 to the exhaust gas system.

On the other hand, if the engine or vehicle speed exceeds the value $n2$ as shown in FIG. 4, the air pressure within the housing 9 increases so that the auxiliary valve 42a bends against the tension of the conical coil spring 43a with the result that unnecessary air depicted by B in FIG. 4 passes through the auxiliary passages 39, 37 and opening 34 into the atmosphere as shown by the state in FIG. 2. Accordingly, the air pressure within the passage 8, housing 9 and conduit 11 is held constant so that a constant secondary air denoted by A in FIG. 4 is supplied to the exhaust gas system of the engine.

Further, if the engine or vehicle speed exceeds a predetermined value $n3$ as shown in FIG. 4, the solenoid valve device 17 is de-energized by the detector 18 with the result that the valve 20 closes the vacuum passage 21. Accordingly, the vacuum does not reach into the vacuum passage 22 and vacuum chamber 24, and the diaphragm 25 and the rod 29 are elevated by the tension of the spring 26, the gasket 38 is disconnected from the upper surface of the flange 31 of the housing 9 with the result that the air fed by the air pump 5 and designated by C in FIG. 4 is discharged through the opening 34 into the atmosphere as shown in FIG. 3. This in turn causes the air pressure within the conduit 11 to become so small that the check valve 13 closes by the tension of the spring 14 with the result that the communication between the conduit 11 and the conduit 12 is shut off and the secondary air supply to the exhaust gas system of the engine is shut off.

Figure 5:
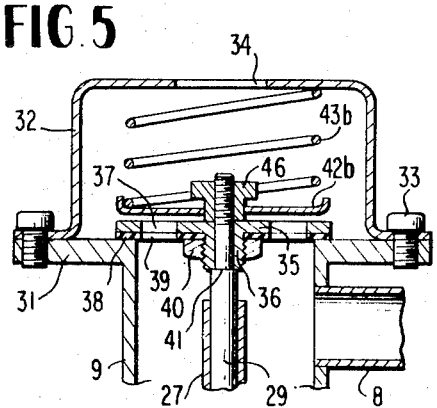
FIG. 5 is a sectional view of an alternative device of this invention.

In a modified device shown in FIG. 5, the valve 35 with the gasket 38 and nut 40 is engaged with the upper end of the rod 29 and its upper side is urged through the auxiliary valve 42b of circular shape by the coil spring 43b which is weaker in tension than that of the spring 26 disposed within the diaphragm 23, but still stronger than check valve spring 14. The stopper 46 is threaded at the end of the rod 29 to prevent upward movement of the valve 35. When the pressure within the housing 9 reaches a predetermined value as shown by P in FIG. 4 upon the valve 35 closing, the auxiliary valve 42b elevates against the tension of the coil spring 43b with the result that the unnecessary air shown by B in FIG. 4 is discharged into the atmosphere so that the pressure within the housing 9 and thus within conduit 11 may be held constant.

It should be understood from the foregoing that the device of this invention closes the auxiliary valves 42a and 42b upon low engine or vehicle speed as shown by $n1-n2$ in FIG. 4 whence all the secondary air fed by the air pump 5 is supplied to the exhaust gas system of the engine and that upon higher engine or vehicle speed as shown by $n2-n3$ in FIG. 4 the auxiliary valves 42a and 42b are opened so as to discharge unnecessary air into the atmosphere so that only the amount of secondary air required for removing the unburned detrimental component in the exhaust gas is supplied to the exhaust gas system. It should be further understood that upon high engine or vehicle speed when it is unnecessary to supply the secondary air as shown by $n3$ in FIG. 4 the valve 35 is elevated so that all the secondary air is discharged into the atmosphere.

It is also understood that since the secondary air is not supplied to the exhaust gas system upon high engine or vehicle speed, the temperature of the exhaust gas is not increased over required value so as to increase the durability of the exhaust gas system.

It is finally noted that nut 45 which prevents the valve 35 and holder 44 from moving upwardly may be omitted and a screw provided at the center of the holder 44 and threadedly engaged into the end of the rod 29.

What is claimed is:

1. A device for controlling the air supply to an exhaust gas purifying device which comprises, an air pump driven by an internal combustion engine and connected to the exhaust gas system of the internal combustion engine through a first conduit having a check valve means, a second conduit connected at one end to the first conduit between the air pump and the check valve, and at the other end to the atmosphere, the second conduit containing a main valve operated by speed responsive valve operating means, an auxiliary valve which seats upon plural auxiliary passages contained in the main valve and resilient means for closing the auxiliary valve having a larger closing force than that of the check valve whereby at low engine speed and correspondingly low air pump pressure the speed responsive valve operating means closes the main valve and the resilient means closes the auxiliary valve against the low pressure and the entire air pump supply flows through the first conduit and check valve to the exhaust gas system and at a low engine speed and a greater air pump pressure the auxiliary valve is opened against the resilient closing means to hold the pressure in the conduits below a predetermined value while at a higher engine speed the speed responsive valve operating means opens the main valve and allows the air from the air pump to bypass the first conduit and check valve and flow directly to the atmosphere.

2. A device for controlling the air supply to an exhaust gas purifying device as claimed in claim 1 wherein the auxiliary valve includes a disc of resilient rubber fixed to the rod and connected to the main valve at the center thereof and a conical coil spring which engages the disc to close the auxiliary passages of the main valve.

3. A device for controlling the air supply to an exhaust gas purifying device as claimed in claim 1 wherein the speed responsive valve operating means comprises;
  (a) a diaphragm assembly containing a diaphragm,
  (b) a vacuum passage which connects the intake vacuum of the engine to one side of the diaphragm,
  (c) a rod fixed at one end to the main valve and at the other end to the diaphragm,
  (d) a valve in the vacuum passage,
  (e) means for detecting engine speed, and
  (f) a solenoid means electrically connected to said detecting means for operating the vacuum passage valve whereby the solenoid means contacts the valve to close the vacuum passage when the engine speed exceeds a predetermined amount which activates the diaphragm which in turn through the rod activates the main valve.

4. A device for controlling the air supply to an exhaust gas purifying device as claimed in claim 3 wherein a housing is fixed to the diaphragm assembly, the housing having an end communicating with the atmosphere, the rod passing through the housing so as to open or close the main valve fixed to the rod, and the second conduit being connected to the said wall of said housing.

5. A device for controlling the air supply to an exhaust gas purifying device as claimed in claim 4, further comprising a casing having a port opening to the atmosphere and secured to said end of the housing, the auxiliary valve having a disc member disposed so as to move in a predetermined range in the axial direction of the rod on the rod at the center and a coil spring provided between the casing and said auxiliary valve and energizing said disc so as to close said auxiliary passage of said valve.

References Cited

UNITED STATES PATENTS

| | | | |
|---|---|---|---|
| 3,397,534 | 8/1968 | Knowles | 60—30 |
| 3,430,437 | 3/1969 | Saussele | 60—30 |
| 3,433,242 | 3/1969 | Voorheis | 60—30 |

DOUGLAS HART, Primary Examiner

U.S. Cl. X.R.

417—293